May 7, 1957  A. A. WALTERS  2,791,033

ADAPTER FOR DIAL INDICATORS

Filed Feb. 16, 1954

ALBERT A. WALTERS,
INVENTOR.

BY George J. Smyth

ATTORNEYS.

United States Patent Office 2,791,033
Patented May 7, 1957

2,791,033

ADAPTER FOR DIAL INDICATORS

Albert A. Walters, Compton, Calif.

Application February 16, 1954, Serial No. 410,512

1 Claim. (Cl. 33—148)

This invention relates to measuring instruments and is directed to an adapter for use with a conventional dial indicator to provide a direct reading inside caliper. An inside micrometer of the caliper type with a direct reading dial is of special utility for the skilled craftsman who has frequent occasion to gage inside diameters of O-ring grooves, snap ring grooves, blind bores, tapered bores, bell-mouthed bores, thread reliefs, undercuts and the like. Unforunately, however, such a precision measuring instrument as heretofore available in commerce is a far too costly auxiliary tool to warrant purchase by the average craftsman who already has the burden of maintaining a comprehensive kit of tools and measuring devices. Consequently the average craftsman must resort to gaging procedures that are much more time-consuming and usually much less accurate than possible with a direct reading inside micrometer.

The present invention meets the need for such a costly specialized gauge by taking advantage of the fact that a skilled craftsman, who has frequent occasion for precise measurement, customarily includes a relatively inexpensive dial indicator in his kit, or at least can afford to purchase a conventional dial indicator where it can be shown that such a purchase will save time and reduce gauging errors. The invention meets the need by providing a simple and rugged adapter which may be easily and quickly operatively connected with a conventional dial indicator to provide a direct reading caliper for close accurate measurements of inside diameters.

The presently preferred embodiment of the invention comprises two longitudinal frame members positioned side by side and pivotally interconnected at intermediate points to provide a first pair of variably divergent sensing arms for contact with objects to be measured and a second pair of variably divergent arms inversely responsive to the first pair. Thus, opening movement of the sensing arms results in closing movement of the responsive arms. Clamp means on one of the responsive arms is adapted to releasably hold a dial indicator thereon and suitable contact means is provided on the other responsive arm for operating the sensing finger of the releasably clamped dial indicator. The effective lengths of all of the arms are equal so that all movements of the sensing arms will cause equal movements of the sensing finger of the dial indicator. This contact means is manually adjustable for calibration of the dial indicator with selected degrees of divergence of the pair of sensing arms.

Preferably suitable yielding means acting in stress between the two frame members continuously urges the sensing arms apart and an adjustable stop means, also effective between the two frame members, limits the movement of the sensing arms, the stop means being adjustable for selectively varying the angle to which the two sensing arms are opened by the yielding means.

The preferred embodiment of the invention is a light compact device which is comparable in size to an ordinary pencil and fits the hand with the same comfort and convenience as a pencil. A further feature of the preferred embodiment of the invention is that the light and relatively small device may be adapted for measuring a wide range of inside diameters. For this purpose, the adapter includes a set of interchangeable gauge point means that may be mounted selectively on the ends of the sensing arms in accord with different inside diameters to be measured by the device.

The features and advantages of the invention may be readily understood from the following detailed description considered with the accompanying drawing.

In the drawing, which is to be regarded as merely illustrative:

Figure 1:
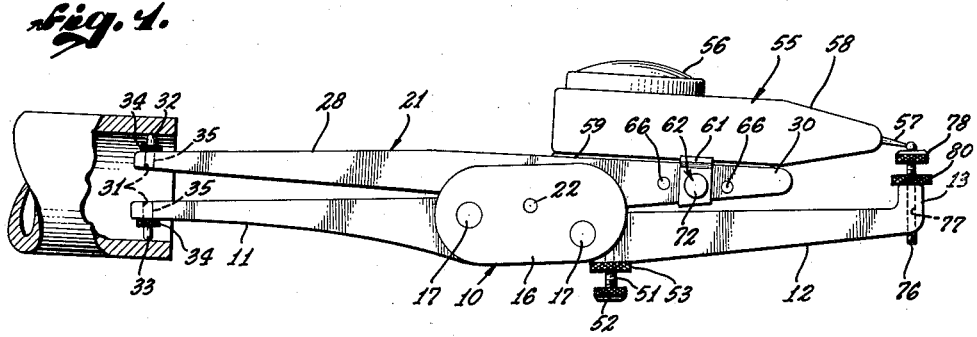
Figure 1 is a side elevation of the preferred embodiment of the invention with a dial indicator mounted thereon for accurately calipering an inside diameter.

The presently preferred embodiment of the invention illustrated in the drawing includes a base structure, generally designated by numeral 10, having two oppositely extending fixed longitudinal arms 11 and 12. Preferably the arm 11 is of slender tapering construction as shown, and the arm 12 is formed with an angled end 13.

Figure 2:
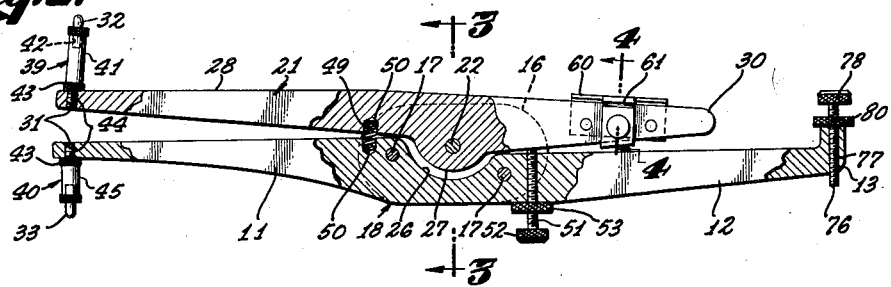
Figure 2 is a similar view, partly broken away, showing the device without the dial indicator and showing how the device may be adapted for measuring relatively large inside diameters.

The base structure 10 in this particular embodiment of the invention may be formed by mounting a pair of parallel side plates 16 by suitable rivets 17 on the opposite sides of an intermediate portion of a longitudinal frame member 18, the configuration of the frame member being best shown in Figure 2. The two side plates 16 overhang one side edge of the frame member 18 to form therewith a longitudinal guide channel 20 for co-operation with a second longitudinal frame member 21. The second frame member 21 extends snugly into the guide channel 20 and is pivotally mounted therein by a rocker pin 22 that is carried by the two side plates 16.

Preferably the frame member 18 is formed with an arcuate recess 26 that deepens the guide channel 20 in the region of the rocker pin 22 and the second frame member 21 is formed with an arcuate enlargement 27 that extends into the arcuate recess. This arrangement provides extensive guide surfaces in contact with the opposite sides of the second frame member 21 to eliminate side wobble of the second frame member and thus insures accuracy in the measuring function of the device.

The second frame member 21 functions as a lever having an arm 28 of slender tapering configuration paired with arm 11, and a second shorter arm 30 paired with arm 12. Thus the two frame members 18 and 21 form a pair of variably divergent sensing arms 11 and 28 and a pair of inversely responsive arms 12 and 30. The sensing arms 11 and 28 contact objects to be measured and opening movement of the sensing arms results in closing movement of the responsive arms 12 and 30.

In the particular construction shown in the drawing, the two sensing arms 11 and 28 are provided with suitable elements to serve as contacts or gauge points for contact with the interior surfaces of an object to be measured. For this purpose, each of the two sensing arms 11 and 28 has a threaded bore 31 in its outer end. Figure 1 shows a pair of relatively short gauge point elements 32 and 33 on the two sensing arms 11 and 28 respectively. Each of these elements 32 and 33 has a knurled flange 34 and is formed with a threaded stem 35 in engagement with the corresponding threaded bore 31.

A feature of the preferred practice of the invention is the concept of using interchangeable gauge point elements or interchangeable extensions for the elements to adapt the instrument for measuring inside diameters of various ranges of magnitude. It is contemplated that such interchangeability will enable the device to measure accurately diameters as large as six inches or more. Figure 2, for example, shows two gauge point assemblies 39 and 40 that may be substituted respectively for the gauge point elements 32 and 33.

Figure 3:
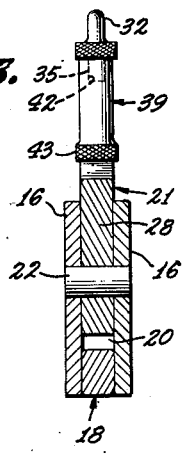
Figure 3 is an enlarged cross-section taken as indicated by the line 3—3 of Figure 2.
Figure 4:
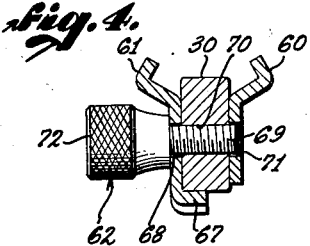
Figure 4 is an enlarged cross-section taken as indicated by the line 4—4 of Figure 2.

A special feature of this particular embodiment of the invention is that each of the two gauge point assemblies 39 and 40 includes one of the shorter gauge point elements 32 and 33 together with an extension member, these two comprising the gauge point assembly. Thus, the gauge point assembly 39 comprises the gauge point element 32 and an extension member 41, which extension member, as best shown in Figure 3, has a threaded axial bore 42 at its outer end to receive the threaded stem 35 of the gauge point element 32. The extension member 41 has a knurled portion 43 and is formed with a threaded stem 44 which screws into the threaded bore 31 of the sensing arm 28. In like manner, the gauge point assembly 40 comprises the gauge point element 33 and an extension member 45 into which the gauge point element is threaded. The extension member 45 has the usual knurled portion 43 and threaded stem 44.

Preferably suitable means is provided to urge the two sensing arms 11 and 28 apart and suitable adjustable means is provided to limit the opening movement of the two arms. As shown in Figure 2, the yielding means may comprise a small coil spring 49, seated in two blind bores 50 in the two arms 11 and 28, the two blind bores being in the bottom of the guide channel 20 between the two side plates 16. The adjustable stop means may comprise a suitable thumb screw 51, having a knurled head 52, the thumb screw being threaded through the arm 12 into abutment with the arm 30. A suitable knurled stop nut 53 on the thumb screw permits the thumb screw to be locked at any selected position. Thus, the thumb screw 51 cooperates with the two responsive arms 12 and 30 to determine the extent to which the two sensing arms 11 and 28 are normally held open by the coil spring 49.

The arm 30, which is the shorter of the two responsive arms, is suitably adapted to hold a conventional dial indicator in a releasable manner, as shown in Figure 1. The dial indicator 55 is of a well known type having the usual dial 56 and the usual pivoted sensing finger 57 which extends forward from the dial indicator body 58. The body 58 of the dial indicator is formed with a V-shaped groove 59 that extends around its base.

In this particular embodiment of the invention, the means for releasably retaining the dial indicator 55 on the arm 30, comprises a pair of clamping jaws 60 and 61 together with a clamping screw 62. The clamping jaw 61 is an angular sheet metal element that is fixedly mounted on one side of the arm 30 by a pair of screws 66. The cooperating clamping jaw 61 is a similar sheet metal element, having a flange 67 that hooks under the arm 30. The clamping jaw 61 has an aperture 68, by means of which it is loosely mounted on the shank 69 of the clamping screw 62. The shank 69 of the clamping screw is threaded into a transverse bore 70 in the arm 30, and the fixed clamping jaw 60 has an aperture 71 to provide clearance for the end of the screw shank. The clamping screw 62 preferably has a knurled head 72. It is apparent that the clamping screw 62 may be loosened for separation of the two jaws 60 and 61 to receive the base of the dial indicator 55 and that the screw may then be tightened to bring the two jaws 60 and 61 into secure engagement with the V-shaped groove 59 around the base of the dial indicator body.

Any suitable adjustable means may be provided on the longer responsive arm 12 for operative contact with the sensing finger 57 of the dial indicator 55. In the present construction, a suitable thumb screw 76 is threaded into a transverse bore 77 in the angled end 13 of the arm 12, the thumb screw having a knurled head 78 for contact with the end of the sensing finger 57. A suitable stop nut 80 is provided to immobilize the thumb screw 76 at selected positions of adjustments.

The effective length of the two sensing arms is the distance from the center of the bores 31 to the axis of the rocker pin 22. It is contemplated that the effective lengths of the two responsive arms will be the same as measured from the axis of the rocker pin 22 to the axis of the outer thumb screw 76. Thus movements of the sensing arms relative to each other will cause precisely equal movements of the sensing finger 57 of the clamped dial indicator 55.

The manner in which the described device serves its purpose may be readily understood from the foregoing description. Normally the caliper adapter in the craftsman's kit is entirely separate from the dial indicator 55, but it is a simple matter to clamp the dial indicator on the arm 30 whenever it is desirable to measure an inside diameter.

In the recommended procedure, the first step is to select the gauge point elements or gauge point assemblies that are appropriate for the particular magnitude of diameter that is to be measured. The next step is to adjust the stop screw 51 for proper spacing of the gauge points on the two sensing arms 11 and 28. The spacing of the gauge points by the stop screw should be, of course, slightly larger than the diameter to be checked. Preferably a micrometer is used to obtain an adjustment at which the gauge points are larger than the dimension to be checked by an amount equal to .015 inch less one-half of the dial indicator range or travel of the sensing finger 57. The dial indicator 55 is then clamped in position with the sensing finger 57 in contact with the thumb screw 78 and then the thumb screw 78 is adjusted to cause the indicator hand to make the full travel which usually amounts to .030 inch. Finally, a micrometer is used for guidance in adjusting the gauge points to the desired dimension, with the indicator hand registering zero. The device will now check the inside dimension of an object to within plus or minus .015 inch of the selected dimension.

My description, in specific detail, of a preferred embodiment of the invention will suggest to those skilled in the art, various changes, substitutions, and other departures from my disclosure that properly lie within the spirit and scope of the appended claim.

I claim:

An adapter for use with a conventional dial indicator having a pivoted longitudinal sensing finger to co-operate therewith to serve as a direct reading inside caliper, said adapter comprising: two longitudinal frame members positioned side by side and pivotally interconnected at intermediate points to provide a first pair of variably divergent sensing arms of equal length for contact with objects to be measured and a second pair of variably divergent arms inversely responsive to the first pair, one of said responsive arms being substantially shorter than the other; a first thumb screw threaded into the end of the longer responsive arm for contact with said sensing finger of the dial indicator; a lock nut on said thumb screw, spring means urging said sensing arms apart; a second thumb screw threaded into said longer responsive arm in a position for contact with said shorter responsive arm for selectively limiting the divergence of said sensing arms by said spring means; a lock nut on said second thumb screw; a first angular clamping jaw fixedly mounted on one side of the shorter responsive arm; a screw having a head for manual rotation and having a shank threaded into said shorter arm from the other side of the shorter arm; a second angular clamp jaw to cooperate with said first jaw to clamp said dial indicator on the first arm with the longitudinal sensing finger of the dial indicator extending beyond the end of the shorter responsive arm in a direction generally longitudinally of the shorter responsive arm, said second jaw having an aperture therein and being mounted by said aperture on said shank to be forced by said head toward said first jaw, said second jaw having a portion in engagement with said shorter responsive arm to keep the second jaw from rotating about the axis of said shank, said two jaws forming a channel oriented longitudinally of said shorter responsive arm for sliding adjustment of the dial indicator longitudinally of the shorter responsive arm for correct positioning of the sensing finger of the dial indicator for cooperation with said first thumb screw.

References Cited in the file of this patent

UNITED STATES PATENTS

| | | |
|---|---|---|
| 1,539,356 | Horstmann | May 26, 1925 |
| 1,644,967 | Wettrich | Oct. 11, 1927 |
| 2,468,496 | Ingle | Apr. 26, 1949 |

FOREIGN PATENTS

| | | |
|---|---|---|
| 530,117 | Great Britain | Dec. 5, 1940 |